(12) United States Patent
Consolaro

(10) Patent No.: US 11,357,701 B2
(45) Date of Patent: Jun. 14, 2022

(54) PROCESS FOR REALIZING A CLOSING DEVICE FOR AN ASEPTIC CONTAINER

(71) Applicant: Brevetti Angela S.r.l., Arzignano (IT)

(72) Inventor: Roberto Consolaro, Arzignano (IT)

(73) Assignee: Brevetti Angela S.r.l., Arzignano (IT)

( * ) Notice: Subject to any disclaimer, the term of this patent is extended or adjusted under 35 U.S.C. 154(b) by 142 days.

(21) Appl. No.: 16/485,453

(22) PCT Filed: Feb. 21, 2018

(86) PCT No.: PCT/IT2018/050024
§ 371 (c)(1),
(2) Date: Aug. 13, 2019

(87) PCT Pub. No.: WO2018/154617
PCT Pub. Date: Aug. 30, 2018

(65) Prior Publication Data
US 2020/0038288 A1    Feb. 6, 2020

(30) Foreign Application Priority Data

Feb. 23, 2017    (IT) .................. 102017000020789

(51) Int. Cl.
*B29C 45/16* (2006.01)
*A61J 1/14* (2006.01)
(Continued)

(52) U.S. Cl.
CPC ......... *A61J 1/1412* (2013.01); *B29C 45/0081* (2013.01); *B29C 45/16* (2013.01);
(Continued)

(58) Field of Classification Search
None
See application file for complete search history.

(56) References Cited

U.S. PATENT DOCUMENTS 3,888,377 A * 6/1975 Stadler .................. A61J 1/1425
215/249
4,501,372 A * 2/1985 Hansen ................ B65D 51/002
215/247
(Continued)

FOREIGN PATENT DOCUMENTS

CA    2442543 A1 * 12/2002 ........... B65D 51/002
DE    10127823    8/2002
(Continued)

OTHER PUBLICATIONS

International Search Report and the Written Opinion dated May 4, 2018 From the International Searching Authority Re. Application No. PCT/IT2018/050024. (14 Pages).
(Continued)

*Primary Examiner* — Edmund H Lee

(57) ABSTRACT

The invention relates to a watertight closing device (100, 200) for an aseptic container, comprising an external shell (10, 210) made up of a first protecting material, a nucleus (20, 220) made up of a second material suitable for being punched, and a tab (11, 211) equipped with a first free end (12, 212) and with a second end (13, 213) connected to the shell (10, 210).
The nucleus (20, 220) has a protruding element (21, 221) placed in correspondence with the connection area (14, 214), so that the protruding element (21, 221) is directly connected to the second end (13, 213) of the tab (11, 211).

3 Claims, 1 Drawing Sheet

(51) Int. Cl.
*B65D 17/28* (2006.01)
*B29C 45/00* (2006.01)
*B29K 101/12* (2006.01)
*B29L 31/56* (2006.01)

(52) U.S. Cl.
CPC .... B65D 17/4012 (2018.01); *B29C 2045/167* (2013.01); *B29K 2101/12* (2013.01); *B29L 2031/565* (2013.01)

(56) References Cited

U.S. PATENT DOCUMENTS

| | | | | |
|---|---|---|---|---|
| 5,381,935 A | * | 1/1995 | Mock | B29C 45/0017 222/541.5 |
| 6,050,435 A | * | 4/2000 | Bush | B65D 47/2031 215/250 |
| 2004/0112855 A1 | * | 6/2004 | Becker | B65D 51/002 215/247 |
| 2004/0217082 A1 | * | 11/2004 | Claessens | A61J 1/1425 215/249 |
| 2012/0012586 A1 | | 1/2012 | Rinderer et al. | |
| 2015/0157535 A1 | | 6/2015 | Frishman | |

FOREIGN PATENT DOCUMENTS

| | | | |
|---|---|---|---|
| DE | 102008009418 | 4/2009 | |
| DE | 102012102881 | 10/2013 | |
| EP | 0503330 A1 * | 9/1992 | ............ B65D 53/00 |
| WO | WO 2018/154617 | 8/2018 | |

OTHER PUBLICATIONS

Rapporto di Ricerca e Opinione Scritta [Search Report and Written Opinion] dated Nov. 8, 2017 From the Ministero dello Sviluppo Economico, Direzione Generale Sviluppo Produttivo e Competitivita, Ufficio Italiano Brevetti e Marchi Re. Application No. IT201700020789. (11 Pages).

* cited by examiner

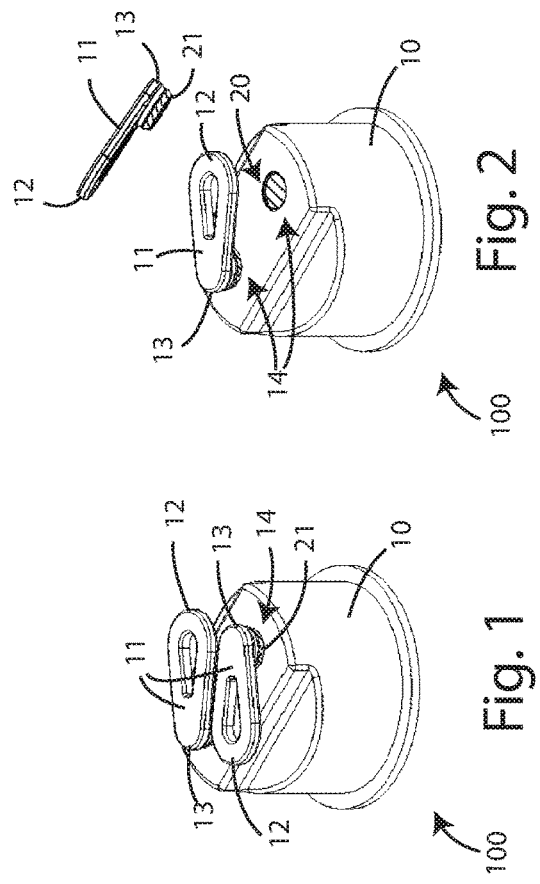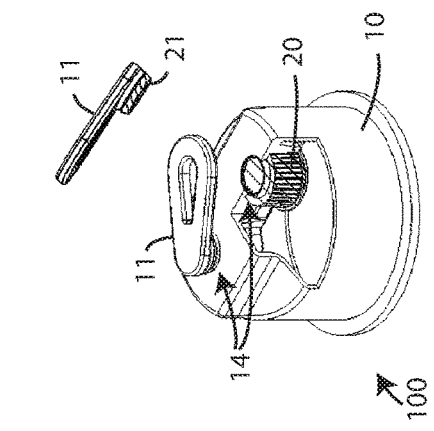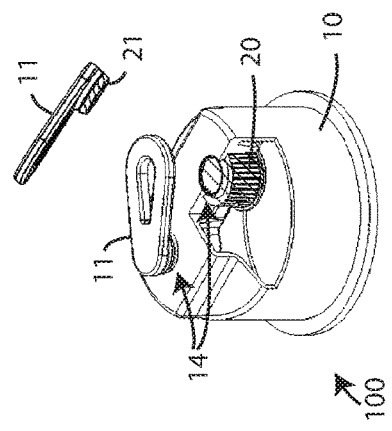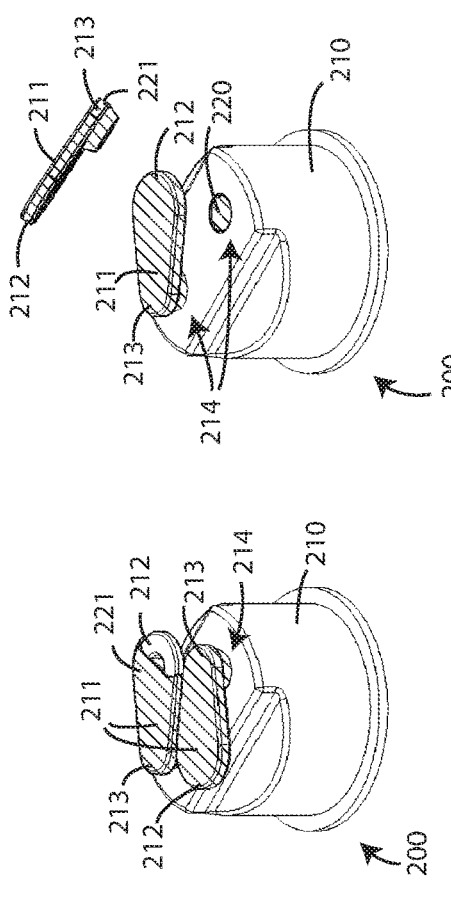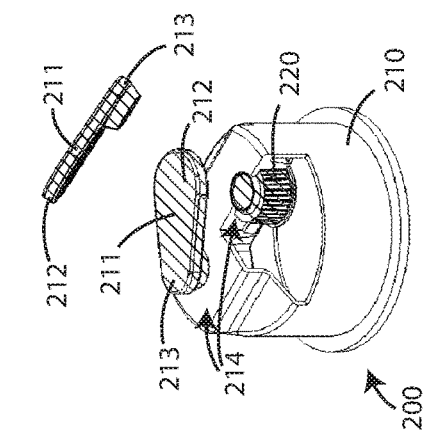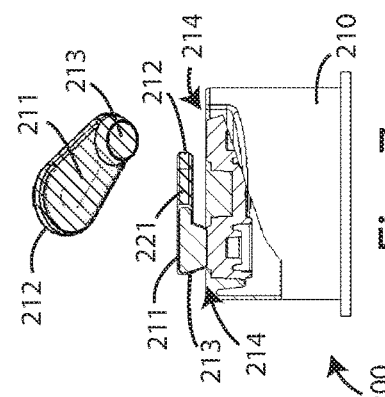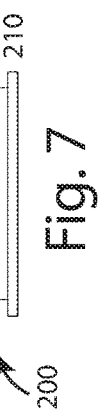

PROCESS FOR REALIZING A CLOSING DEVICE FOR AN ASEPTIC CONTAINER

The present invention relates to a closing device for an aseptic container, for example a bottle, a syringe or a vial; in particular, the invention may cover a closing device for a bottle intended to contain a medical liquid.

In detail, the invention refers to a closing device for a container or a vial, suitable for being opened easily by the operator and punched by a tool for collecting the liquid, for example a needle of a syringe or an intravenous line for infusion.

Processes for realizing easy-open closing devices exist, providing the co-injection of a first material for the inner portion, in contact with the liquid, and of a second material for the external portion, for protecting from the external environment and from unintentional punches.

For example, devices exist, which comprise a nucleus made up of the first material and a shell made up of the second material, equipped with a hole for making the second material accessible, so that it can be easily punched.

Such devices have the drawback of exposing their nucleus to an unintentional punch, for example when the operator is not yet ready.

Moreover, another drawback is two to the risk of contamination of the nucleus, since it is directly exposed to the environment. In fact, a punch may allow external elements passing, which were deposited on the surface of the nucleus facing to outside: a needle, passing from outside to inside the container may carry with it such external elements.

A variant of such kind of existing closing devices provides—adding to the hole into the external shell—a tab made up of only a second material, in order to protect such hole.

Such variant has the drawback of having not a straightforward opening or, in case of a weakening line for facilitated opening, the opening occurs also accidentally.

In detail, an unwise operator, handling the container, may hit unintentionally such tab and cause the detachment thereof, with the obvious consequence that the closing device has the abovementioned drawbacks.

Thus the need for a closing device for aseptic container allowing the containment and the storage of a substance that is easy to open by a user, but which at the same time is safe from the point of view of the accidental openings, remains.

The present invention aims to overcome the just claimed difficulties of the prior art.

In particular, the main aim of the invention is develop a watertight closing device for an aseptic container, assuring aseptic conditions in accordance with the regulations in force.

Moreover, object of the present invention is offering a closing device for an aseptic container which, in respect with the known co-injection technique, decreases the risks and the level of contamination of the components of the same closing device.

Another aim of the present invention is to devise a closing device for an aseptic container which is applicable to any traditional aseptic container, for example made up of glass.

Further aim of the invention is offering a closing device for an aseptic container for medical liquids assuring an easier use for the operator or for the containers to which it is applied.

The said purposes are achieved by a process for realizing a closing device for an aseptic container for medical liquids according to the attached independent claim 1, to which reference is made for brevity.

Further detailed application features of the device of the invention are highlighted in the respective dependent claims.

Advantageously, the device of the invention allows making a container for medical liquids totally aseptic and to permit, as a consequence, a subsequent use under optimum safety conditions hygienically and from the point of view of human health, of patients and operators.

Equally advantageously, this is reflected in a significant reduction of the production cost of a container in respect with the present state of technology, obviously everything else being equal.

In an advantageous manner, moreover, the aseptic container obtained embedding the closing device of the invention has features at least equal to those of the known aseptic containers, in respect of which keeps, however, the just highlighted advantages.

The said aims and the advantages, as well as others that will emerge later, will appear to a greater extent from the following description, concerning preferred embodiments of the device of the invention, given by way of example and illustrative, but not limiting, with reference to the drawings attachments wherein:

FIG. 1 shows a closing device according to a first embodiment of the invention in closed position;

FIG. 2 shows the device of FIG. 1 in a first step of opening;

FIG. 3 shows the device of FIG. 1 in a second step of opening;

FIG. 4 shows a closing device according to a second embodiment of the invention in closed position;

FIG. 5 shows the device of FIG. 4 in a step of opening;

FIG. 6 shows an axonometric cross-section of the device of FIG. 5;

FIG. 7 shows a cross-section of the device of FIG. 5.

Referring to the mentioned FIGS. 1-3, the closing device subject matter of the invention, generically referred to with 100, comprises an external shell 10, made up of a first material, preferably rigid or however not easily drillable, and a nucleus 20, made up of a second material (depicted in figure with diagonal hatch), preferably elastic or however easily drillable.

The device 100 comprises also at least a tab 11—in the example shown in figure, there are two tabs—equipped with a first end 12, free, and with a second end 13, connected to the shell 10 in correspondence with a connection area 14.

The tab 11 is made up of the same first material of the shell 10 and has, preferably, an easy to break area, for example a weakened line in correspondence with the connection area 14 with the same shell 10.

In detail, the whole device 100 is realized by the co-injection process of the first and the second material, so that the shell 10 is realized before injecting the nucleus 20.

The co-injection has the main aim of joining the second material with the first. The present invention exploits the co-injection of the two materials for example thermoplastic materials as in the known system, but at the same time has the aim of making the area 14 (the opening area of the seal, for example removing the tab 11) a zone with a less though junction with the tabs, in order to allow a breakup of the seal and the easy detachment of the two coupled surfaces (FIG. 3). In other words, the area 14 has a weakened zone, comprising for example an easy to break zone, or a thinning zone.

The nucleus 20 has a protruding element 21 placed in correspondence with the connection area 14, so that the second end 13 of the tab 11 is directly connected, preferably at least partially embedded, to the protruding element 21.

In other words, the shell 10 covers and protects the surfaces of the nucleus 20 which otherwise would be exposed to open air.

Nevertheless, during the second injection, i.e. during the injection of the second material for realizing the nucleus 20, pushing the injection is possible, so that the second material passes through the easy to break area 14, creating a protruding element 21, surrounding a part of the free end 13 of the tab 11.

For example, the area 14 may comprise a membrane made up of first material, so thin as to temporarily open the passage for the second material, which is injected hot and thus able to partially melt down the same membrane.

As an alternative, the area 14 may comprise open sections in the same shell 10 in order to allow the passage for the material 20 during the second injection.

Such area 14 of the shell 10 acts thus as an at least partial barrier between the same nucleus 20 and the protruding element 21.

The second end 13 of the tab 11 covers a part of the surfaces of the protruding element 21 which leak.

The protruding element 21 acts as a reinforcing for the connection between the second end 13 of the tab 11 and the shell 10.

In such a way, it is possible providing for a weakened line (not shown), or however an easy to break area, in order to facilitate the opening by removing the tab 11 and—in case of unintentional opening, due for example to a hit—the protruding element 21 would keep in place the tab 11 and would maintain the aseptic condition of the device 100.

The variant shown in FIGS. 4-7 relates to a closing device 200 which comprises an external shell 210, analogous to the shell 10 of FIGS. 1-3, wherein the injection of the second material has completely covered the tabs 211, passing through the easy to break area 214 as above explained.

Analogously thus to the device 100 of FIGS. 1-3, the shell 210 is made up of a first material, preferably rigid or however not easily drillable, by a first injection, while the nucleus 220 is made up of a second material (depicted in figure with diagonal hatch), preferably elastic or however easily drillable, by a second injection.

The tab 211 is equipped with a first end 212, free, and with a second end 213, connected to the shell 210 in correspondence with the connection easy to break area 214.

The tab 211 is, in a first moment, made up of first material, during the first injection; in a second moment, during the second injection, the second material of the nucleus 220 passes through the weakened area 214, for example melting down a part of the first material, and covers the tab 211. The easy to break area 214, for example a weakened line or a thin membrane, acts as a connection between the shell 210 and the tab 211.

In other words, the shell 210 covers and protects the surfaces of the nucleus 220 which would be exposed to open air, while a layer 221 made up of the second material covers and protects the surfaces made up of first material of the tabs 211.

In such a way, advantageously—in case of an unintentional hit of the tab 211—the elasticity of the layer 221 would keep in place the tab 211 and would maintain the aseptic condition of the device 200.

In substance, the process for realizing the closing device of the invention may comprise the following steps:

injecting a first material in a first mould, for realizing a shell 10, 210 and at least a protecting element 11, 211 connected to the shell in correspondence with an area 14, 214 for connection, injecting a second material within the shell 10, 210 (which acts at least partially as a second mould), for realizing a nucleus 220, during the step of injecting the first material, creating an easy to break area in correspondence with the connection area 14, 214, during the step of injecting the second material, reaching a pressure suitable for making the second material leaking through the easy to break area, in order to create a protruding element 21, 221 which at least partially embeds the protecting element 11, 211.

Advantageously, in both the variants, the easy to break area may comprise a ring having reduced section, for example along the perimeter of the second end 13, 213 of the tab 11, 211.

Alternatively, the easy to break area may comprise a disc having a reduced cross-section, for example equipped with an area substantially corresponding to the connection area of the second end 13, 213 of the tab 11, 211 with the shell 10, 210.

In other cases, the easy to break area may comprise at least partial openings into the shell 10, 210, for example along the perimeter of the second end 13, 213 of the tab 11, 211.

Equally advantageously, in both the variants, a container equipped with a closing device 100 or 200 according to the invention is already packed, and does not require further operations, or treatments before being placed on the market.

From the above description, it is understood, therefore, that the closing devices 100 and 200, and the container which includes them, all subject matter of the present invention, reach the objects and realize the already mentioned advantages.

In the execution phase, changes to the device of the invention may be made; in this case, the operating modes and the details described above will vary accordingly.

It is also specified that the present invention, although it has been described with particular reference to a closing device realized by co-injection, it also extends to closing devices made with other techniques.

It is clear that numerous other variants may be made to the closing device 100 or 200 in question, without thereby abandoning the principles of novelty inherent in the inventive idea expressed herein, as is clear that, in the practical implementation of the invention, the materials, the shapes and the dimensions of the illustrated details may be any according to the requirements and replaced with other technically equivalent ones.

Where the constructive characteristics and techniques mentioned in the subsequent claims are followed by signs or reference numbers, such reference marks have been introduced with the sole objective of increasing the intelligibility of the claims themselves and, as a consequence, they have no limiting effect on the interpretation of each element identified, by way of example only, by such reference marks.

What is claimed is:

1. A process for realizing a closing device (100, 200) for an aseptic container, comprising the following steps:

injecting a first protecting material in a first mould for realizing a shell (10, 210) and a protecting element (11, 211) connected to the shell in correspondence with a connection area (14, 214) for creating an easy to break area in correspondence with the connection area (14, 214);

injecting a second material suitable for being punched within the shell (10, 210) for realizing a nucleus (220); and reaching a pressure during the injection of the second material suitable for making the second material leak through the easy to break area to create a protruding element (21, 221) which embeds the protecting element (11, 211) and is separated apart from the nucleus (20, 220) by the connection area (14, 214) wherein the connection area (14.214) can comprise a membrane made up of the first material thin as to temporarily open the passage for the second material which is injected hot and able to partially melt down said membrane.

2. The process for realizing a closing device (100, 200) according to the claim 1, further comprising a layer (221) embedding the protecting element (11, 211) created during the step of injecting the second material.

3. The process for realizing a closing device (100, 200) according to the claim 1, wherein the easy to break area comprises a ring having a reduced section.

* * * * *